UNITED STATES PATENT OFFICE.

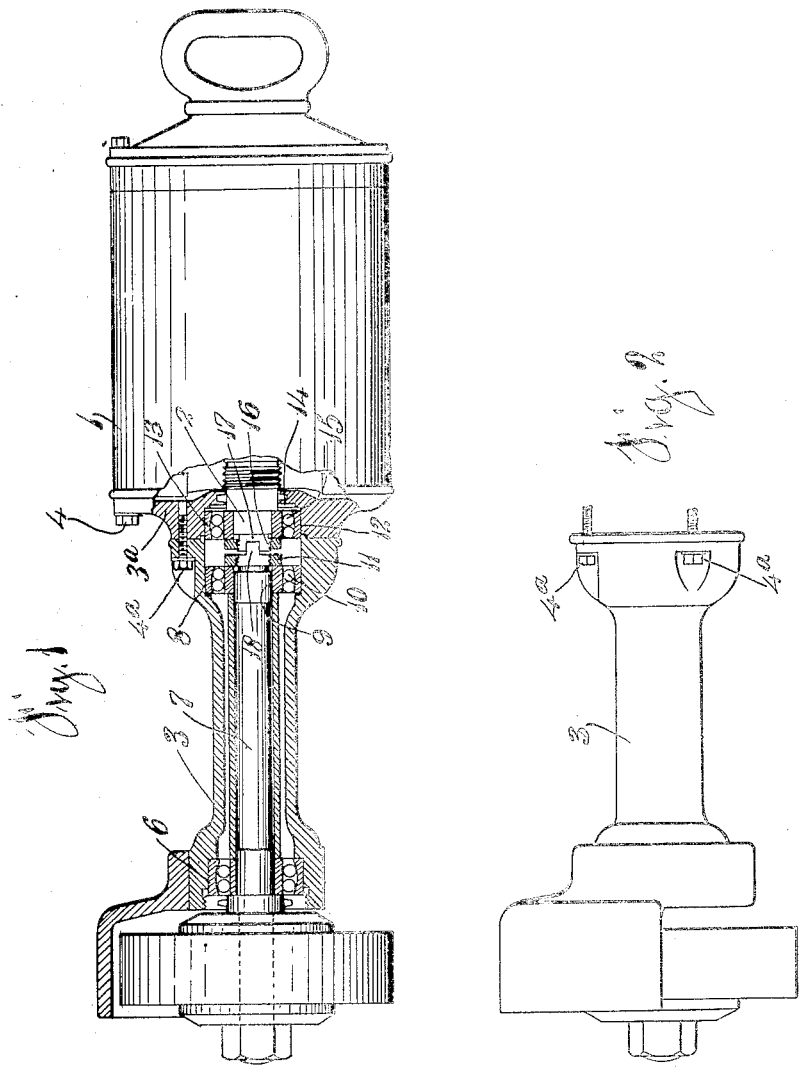

EMIL RITZ, JR., OF CINCINNATI, OHIO, ASSIGNOR TO THE HISEY-WOLF MACHINE COMPANY, OF CINCINNATI, OHIO, A CORPORATION OF OHIO.

PORTABLE ELECTRIC TOOL.

1,259,132.

Specification of Letters Patent.  Patented Mar. 12, 1918.

Application filed June 23, 1917. Serial No. 176,537.

*To all whom it may concern:*

Be it known that I, EMIL RITZ, Jr., a citizen of the United States, and a resident of the city of Cincinnati, in the county of Hamilton and State of Ohio, have invented certain new and useful Improvements in Portable Electric Tools, of which the following is a full, clear, and exact description, reference being had to the accompanying drawing, forming part of this specification.

My invention relates to portable electric tools and more particularly grinders, in which the whole device is held by the operator while using it and the power is supplied from a small electric motor.

In tools of this character it is often desirable to have a separable motor casing and a separate and removable grinding tool. When such is the case, the same motor can be used for different lengths of grinder extensions by simply removing the extension casing which contains the grinding elements and substituting another one.

The greatest difficulty in all grinders having separate motor and grinder shafts and in the detachable kind particularly, is that the coupling together of the two shafts must be done in such a way, and the bearings for the shafts must be so arranged that there will be no quivering of the grinding wheel. Also, of course, the device must be strong and of simple construction so that it will be practical for the heavy work to be accomplished.

It is the object of this invention to provide a bearing and shaft coupling which will give a perfect, non-chattering drive to the extension grinding wheel in the two-shaft type of electric portable grinder, or the like.

This object and other advantages to be noted I accomplish by that certain construction and arrangement of parts to be hereinafter more specifically pointed out and claimed.

In the drawing,

Figure 1 is a central longitudinal section of an extension unit and motor made according to my invention, with the body of the motor and the grinder wheel in elevation.

Fig. 2 is a plan view of the extension unit.

The motor is not shown in the drawing, but it will be understood that it has a casing 1 and a rotor shaft 2, which are all the parts that particularly concern the invention here. The extension unit has a casing 3, and the motor has a removable end cap 3ᵃ. The part 3ᵃ is bolted to the motor casing by means of bolts 4, and the part 3 is dovetailed into the part 3ᵃ and held by bolts 4ᵃ so as to be snug and tight.

Supported in a suitable bearing 6 in the outer end of the extension unit casing is the grinder shaft 7 which carries the grinder wheel and at the inner end of the extension unit casing portion 3 is another bearing for this shaft. As chosen for illustration here, this bearing has an outer ring 8 and an inner ring 9 between which are placed the balls 10. This bearing is of the self adjusting type and in its detail forms no part of my invention. The grinder shaft is threaded just back of the end and set on these threads is a collar 11, which bears against the inner ring of the bearing and thus can be used to take up all longitudinal play of the grinder shaft.

It can be seen that the above described structure provides an extension unit in which the grinder shaft is held snug and tight against any vibration in two bearings, one at each end thereof, in a single member which is complete in itself without calling upon any part of the motor casing to serve as a support for the grinder shaft.

The motor (not shown) will have at the handle end thereof a suitable ball bearing or the like (not shown) for the rotor shaft and at the center of the part 3ᵃ bolted to the motor casing as above described, is a sleeve 12 for another bearing. In this sleeve is located the same kind of a bearing as has been described, comprising an outer ring 13 and an inner ring 14 between which are balls 15. The shaft has also threaded on the end of it a collar 16 which can be tightened up against the inner ring.

Thus the motor shaft is completely provided with bearings at each end in the motor casing independent of the extension unit shaft and the integral member supporting it.

One of the shafts, in this instance the rotor shaft, is provided with a slot 17 at its end, and the other shaft, in this instance the grinder shaft, is provided with a key 18 to fit the slot. By this means the two shafts are coupled together.

For putting on a different lengthed unit, the outer portion of the extension unit casing is removed and another put in its place, or else the device can be secured permanently together in both of which instances the advantage of a non-quivering grinder shaft will be provided, free from the danger of the motor working loose and vibration being imparted to the grinding wheel mounted direct on the rotor shaft.

It is believed that the operation of the device can be readily understood without a separate description of the manner in which it works and that the above description which is confined to the details of a specific form of the invention will sufficiently point out the novel features inherent in my invention and the advantages thereof.

Having thus described my invention, what I claim as new and desire to secure by Letters Patent, is:—

1. In a portable electric tool, a motor having a casing, an extension unit having a casing, a rotor shaft and a grinder shaft, means for keying said shafts together, and separate bearings for both ends of the grinder shaft independent of the rotor shaft, said rotor shaft having a bearing at its outer end adjacent its point of connection with the grinder shaft.

2. The combination of a motor having a casing, and a rotor shaft therein, a grinder shaft, a casing for the grinder shaft, a bearing for the grinder shaft in said casing adjacent the inner end of said shaft, means for mounting the said grinder shaft casing on the motor casing and a bearing for the rotor shaft adjacent its outer end, said rotor and grinder shafts adapted to be detachably secured to each other between said two bearings.

3. The combination of a motor, having a casing, and a rotor shaft, an extension member mounted on the casing, a bearing in said extension member for the outer end of said rotor shaft, a grinder shaft, a casing for said grinder shaft, a bearing for said shaft at the inner end of the said casing, and means for mounting the grinder casing on the extension member, said rotor and grinder shafts adapted to be secured together at a point between their said bearings.

EMIL RITZ, Jr.